UNITED STATES PATENT OFFICE.

ALEX ROITZHEIM, OF DÜREN, GERMANY.

PROCESS FOR THE RECOVERY OF ZINC FROM ITS ORES.

1,100,490.  Specification of Letters Patent.  Patented June 16, 1914.

No Drawing.  Application filed August 28, 1911.  Serial No. 546,304.

*To all whom it may concern:*

Be it known that I, ALEX ROITZHEIM, a subject of the King of Prussia, residing at Düren, Rheinland, Germany, have invented certain new and useful Improvements in Processes for the Recovery of Zinc from Its Ores; and I do hereby declare the following to be a full, clear, and exact description of the invention.

My invention relates to the recovery of zinc by heat treatment, more especially to its recovery by distillation from a reducing charge containing the ore and a reducing agent in a retort or muffle.

The object of the invention is to prevent as much as possible the formation of zinc dust, that is carried by the reducing gases outside of the reduction zone and into the atmosphere, where a considerable portion is lost; and said dust also has a harmful action on the workmen tending the retorts.

I have discovered that the formation of zinc dust is not so much due to improper condensation of the zinc vapors in the condensers, as it is to its unavoidable formation, in the present processes, immediately after charging the reducing chamber.

In the reduction of zinc ores by the use of carbon as a reducing means in muffles, it has long been noted that only a very small amount of molten zinc is deposited or collected in the condensing chamber of the muffle for some time after charging, say about the first three to six hours of the heating of the charge. Instead of molten zinc being deposited, the zinc vapors condense to a gray powder, which, although metallic, does not melt at the melting point of zinc. In order to convert this powder into molten zinc the temperature must be raised again to the vaporization temperature of zinc. Consequently, the formation of this zinc powder, or so called zinc dust, is very objectionable in processes for the recovery of zinc from its ores, and especially so in the distillation processes, where the reduction is carried out in muffles.

The formation of the zinc dust is a source of great loss of metal; much of it is carried out of the condensers by the gases resulting from the heating of the charge; it then becomes oxidized by the oxygen of the air and forms the bluish zinc oxid fumes so destructive to animal and vegetable life about the reduction plant. It has long been a problem to either prevent or reduce the formation of this zinc dust in the reduction of zinc ores.

It is well known that materially thinning the zinc vapor with other gases greatly increases the formation of zinc dust, and almost entirely prevents the condensation of the vapors into molten zinc. Ingalls *Metallurgy of Zinc and Cadmium*, 1906, p. 656; Sodin, *Metallurgie du Zinc*, 1905, pp. 714-717. This undesirable result follows especially when the heat required for the reduction of the ore is supplied by the combustion of a portion of the carbon contained in the charge, whereby large quantities of gases of combustion become mixed with the gases of reduction. It is for this reason, that at the present day it is impossible to reduce zinc ores in shaft furnaces to obtain molten zinc. The product of such furnaces is zinc dust, only. In the muffle the heating gases cannot mix with the gases of reduction.

The process of reduction is carried out in the muffle in accordance with the following equation:

$$ZnO + C = Zn + CO.$$

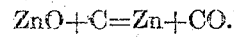

Of course the zinc vapor is mixed with the carbon monoxid; this cannot be avoided under any circumstances. The quantity of CO is, however, very much less than the products of combustion resulting from heating the charge.

If we observe carefully the reduction process in the muffle or retort, we will note that during the first three to six hours after charging, or the beginning of the reduction, the zinc dust is formed, and that after this time the formation of zinc dust almost entirely ceases. Observation of this fact has led me to a solution of the problem for either entirely preventing or almost entirely preventing the formation of zinc dust. This I do by heating the charge, *i. e.* ore and carbon, as usually understood in normal retort practice for the recovery of zinc, before placing said charge in the muffler or retort. I am of opinion that the result is due to the fact that when the charge is placed in the muffle or retort in a cold condition, the reduction commences in the outer portions of the charge adjacent to or in contact with the hot walls of the retort or muffle and before the center of the charge has even become warm. The zinc vapor or fumes pass through the cold interior of the charge on their way to the condenser, condense and become suspended as dust in the reduction gases, and as such enter the condenser, and some of them pass through the condenser, with the gases, into the air. This zinc dust formation continues until the center of the charge becomes sufficiently heated to prevent it, which requires considerable time, by reason of the poor heat conductivity of the charge.

After many years of observation and experimenting I have discovered that the pre-heating temperature for the charge should be about 600° C., i. e., not below this, and not much above it. That is to say, the limits of temperature are comparatively narrow, say 600°. At this low temperature no reduction of zinc can take place, and the temperature is sufficiently high to prevent the physical alteration of the zinc vapor. At over 700° C., a strong reduction of zinc ore takes place, and it is consequently unsuitable to pre-heat the charge above this point. At 600° C. the condensation of zinc vapors does not take place, nor does reduction take place at this temperature. Consequently the charge in any case should be heated only between the temperature at which zinc vapor is not condensed and the temperature at which reduction commences. Should the pre-heating of the charge be carried so far as to partly reduce some of the zinc and condense it within the body of the charge, then when such a charge is placed in the retort the condensed zinc vapors in the form of zinc dust will be carried off as before by the reduction gases, and the result aimed at will not be attained.

My invention comprises either heating the ore separately from the other ingredients of the charge; or heating the mixed charge before it is placed in the retort or reducing chamber, to a temperature sufficient to prevent the described formation of zinc dust. For a mixed charge the temperature should in no case go to or beyond the reduction temperature of the ore, which should be not over 600° C., so that it will be certain that no zinc dust has been formed during this pre-heating period.

The preheating of the charge to about reducing temperature will shorten the time usually required for the reduction of the charge. When the ore and other ingredients of the charge are heated separately, the pre-heating may be carried above 600° C., but should not be carried so high as to vaporize the values of the ore, or to reduce it.

I am aware that I am not the first to preheat a charge of zinc ore before charging it into the reducing chamber; such pre-heating, however, has been done at a temperature unsuitable to accomplish the results attained by my process.

I claim—

1. The step in the process of zinc distillation in retorts, which comprises preheating the charge of ore and reducing material to a temperature above the condensation temperature of zinc and below the reducing temperature of the charge.

2. The step in the process of zinc distillation in retorts, which comprises pre-heating the charge of ore to about 600° C. before charging the same, thereby preventing zinc dust formation.

3. The step in the process of zinc distillation in retorts, which comprises separately pre-heating the constituents of the charge of ore and reducing material to a temperature above the condensation temperature of zinc and below the reducing temperature of the charge.

In testimony that I claim the foregoing as my invention, I have signed my name in presence of two subscribing witnesses.

ALEX ROITZHEIM.

Witnesses:
 EDWARD GOTTSCHALK,
 JOSEPH STODTEN.